United States Patent [19]

Rudolph

[11] 4,381,093
[45] Apr. 26, 1983

[54] FLAP ASSEMBLY FOR AIRCRAFT WING

[75] Inventor: Peter K. C. Rudolph, Seattle, Wash.

[73] Assignee: The Boeing Company, Seattle, Wash.

[21] Appl. No.: 194,769

[22] Filed: Oct. 7, 1980

[51] Int. Cl.³ .............................................. B64C 3/50
[52] U.S. Cl. ................................. 244/216; 244/219
[58] Field of Search ............... 244/212, 213, 215, 216, 244/218, 219

[56] References Cited

U.S. PATENT DOCUMENTS

| 2,836,380 | 5/1958 | Pearson | 244/216 |
| 3,767,140 | 10/1973 | Johnson | 244/216 |
| 4,180,222 | 12/1979 | Thornburg | 244/215 |
| 4,248,395 | 2/1981 | Cole | 244/216 |

FOREIGN PATENT DOCUMENTS 987021 8/1951 France ................. 244/216

1381476 1/1975 United Kingdom ............... 244/216

Primary Examiner—Galen L. Barefoot
Attorney, Agent, or Firm—H. Gus Hartmann; Bernard A. Donahue

[57] ABSTRACT

An airfoil having a trailing edge flap assembly comprising a flap member which in its stowed position is located above a fixed mounting structure. There is a rear pivot link connected at its lower end to the mounting structure and by its upper end to an aft portion of the flap. There is a forward slideway by which the forward part of the flap is mounted for longitudinal slide motion relative to the fixed mounting structure. The flap has a stowed position in the rear portion of the wing, and is movable rearwardly with substantial Fowler motion to an intermediate position for take-off, and movable further rearwardly to a fully extended position where the flap extends rearwardly and downwardly for take-off.

6 Claims, 10 Drawing Figures

FLAP ASSEMBLY FOR AIRCRAFT WING

BACKGROUND OF THE INVENTION

The present invention relates to a flap assembly adapted for use as a trailing edge flap of the wing of an airplane. More particularly, the present invention relates to a flap assembly having capabilities for short take-off and landing aircraft and a variety of other mission requirements.

It is quite common for present commercial aircraft to have single, double or triple slotted flaps that travel in curved tracks. While this arrangement does provide for optimum flap positions for take-off and landing with only small, low-drag fairings, the flap track supports are heavy and have inherent in-service problems with track wear and jamming. The main problem arises from the line contact of the highly loaded aft roller on the track. Another arrangement appears in the Boeing 747 airplane, where there is a single slotted flap mounted on an overhead four-bar linkage.

Some short to medium range airplanes are equipped with double slotted flaps, mounted from a simple hinge below the wing. This flap configuration is designed to provide very high lift coefficients for landing, with take-off lift coefficient and lift-to-drag ratio not being critical. In this particular airplane configuration, the cruise drag of the deep flap support fairings is not too important for the short-range mission.

There is need for improvement for mission requirements where there is relatively high gross weight, high altitude, and limited runway length in that there should be an adequately high lift-to-drag ratio for take-off. For a mix of mission requirements, short and long range, with high gross weight and intermediate runway length, intermediate gross weight and short field length, a flap system with the aerodynamic characteristics of the track guided flaps is desirable. Thus, there is still a need for a flap system having the desirable features of the track guided flaps, while alleviating some of the difficulties associated with such track guided flaps.

To determine the sort of flap arrangement needed, consideration should be given to three basic mission requirements. First, there is the consideration of the length of the landing field and touch down speed limits of the airplane. This condition becomes the flap sizing criteria on short to medium range airplanes with high wing loading for operation from short runways, including short take-off and landing airplanes (i.e., STOL airplanes). The flap position for landing is the fully extended position for maximum lift coefficient.

The next consideration is the take-off field length limit. This influences the choice of flap assembly configuration particularly where there is high thrust to weight ratio airplanes with a requirement for very short take-off field length.

A third consideration is the one-engine-out second segment climb gradient. This condition will generally determine the flap configuration for take-off on twin and three engine airplanes with high wing loading. In order to achieve the minimum climb gradient with one engine failed the airplane lift-to-drag ration has to be optimized. High lift-to-drag ratios can be achieved with high Fowler motion at low flap angles. Since the flap setting for take-off and second segment climb is usually the same, the take-off flap setting is influenced by both take-off field length (the second consideration noted above) and second segment climb gradient.

With regard to the flap motion from stowed to fully deployed position, there are of course a variety of mechanisms in the prior art. As long as the intermediate flap positions are not critical, the criteria for selecting the mechanism are generally simplicity (with low cost and low risk), low load (low weight) and small size (with the resulting low drag). However, where there are rather stringent requirements for take-off field length limit and also the one-engine-out second segment climb gradient, the intermediate positions of the flap are quite critical. Airplanes which are take-off climb gradient critical need a flap system that provides very high Fowler motion at low flap angles, with most of the flap rotation occurring toward the end of deployment of the flap.

Thus, consideration has been given to achieving a flap assembly configuration which provides adequate fowler motion with relatively small flap deflection, while requiring only a small flap support fairing with low cruise drag. It is an object of the present invention to provide such a flap assembly, with a desirable mix of advantageous features such as those discussed above.

A search of the patent literature has disclosed a number of patents showing various flap configurations and means for deploying the flaps. Typical of these are the following:

U.S. Pat. No. 2,352,062, Zap, discloses a trailing edge flap configuration showing flaps not only employing a simple hinge, but also circular arc tracks. In some configurations, these are used separately, and in others, the two are combined, with the track itself being hinged mounted.

U.S. Pat. No. 2,502,315, Erhart, discloses a trailing edge flap configuration where there are two slideways of a particular configuration to which a flap is mounted.

U.S. Pat. No. 2,542,792, Bennett et al, has a trailing edge flap hinged mounted to a rear portion of the aircraft. There is an intermediate flap which is deployed above and forwardly of the main hinge mounted flap.

U.S. Pat. No. 2,556,326, Grant, also shows a hinge mounted trailing edge flap. Further, there is an intermediate flap which has a stowed and a deployed position.

U.S. Pat. No. 2,661,166, Gordon, illustrates a trailing edge flap pivotally mounted to one link which is in turn pivotally connected to a second link that is pivotally mounted to stationary structure. There is a third link, pivotally connected to the trailing edge flap, and also having a pivot connection to a slide-mounted member. The second and third links are interconnected at a pivot point.

U.S. Pat. No. 2,779,555, Danielson, discloses a trailing edge flap arrangement where two links are pivotally connected by first ends of the flap. Opposite ends of the links are mounted in a slideway, with differential movement of the links being provided by two chain drives. This causes the flap to tilt as it moves closer to its rear position.

U.S. Pat. No. 2,974,903, Chomart, shows a trailing edge flap mounted to a stationary track positioned at the elevation of the flap. The forward end of the flap is pivotally connected to a link that is forward of the slideway and pivotally connected by an upper end to stationary structure.

U.S. Pat. No. 3,223,356, Alvarez-Calderon, shows an arrangement of hinge mounted flaps.

U.S. Pat. No. 3,438,598, Tammel, has a trailing edge flap having two support points thereon, each of which is mounted in a respective track. The tracks are arranged so that as the flap moves to its aft position, it is deflected downwardly.

U.S. Pat. No. 3,478,988, Roed, shows trailing edge flaps with a hinge mounting.

U.S. Pat. No. 3,568,957, Wood, discloses a trailing edge flap supported on a curved track at one point. It is also supported from a nut member traveling on a fixedly mounted screw conveyor.

U.S. Pat. No. 3,583,660, Hurkamp, shows a trailing edge flap having several configurations. In one configuration, the flap is supported at one point in a curved track, and by a link having its rear end attached to the rear of the flap, and its forward end secured to stationary structure at a location forward of the track.

U.S. Pat. No. 3,767,140, Johnson, shows a two-flap configuration. The aft flap operates in a slideway of the fore flap, and the fore flap is operated by a linkage system.

British Pat. No. 560,996 discloses a trailing edge flap movable from a stowed position to a rearward deployed position. While the mounting arrangement of this flap is not clearly disclosed, the test of this patent indicates that it is mounted from rails.

SUMMARY OF THE INVENTION

The flap assembly of the present invention is adapted to be mounted to an airfoil having upper and lower surfaces, a forward end and a rear end, a longitudinal axis and a transverse axis. This flap assembly comprises a mounting structure located at a first lower location at the rear end of the airfoil. There is a flap member having a stowed first position above the mounting structure at the rear end of the airfoil and movable rearwardly to a fully extended second position.

A first link mounting means is provided, this having a lower first pivot connecting means attached to said mounting structure at a first connecting location, and an upper second pivot connecting means mounted to the flap member at an upper second connecting location. There is a track mounting means comprising track means and a third connecting means connected to the flap and operatively connected to the track means at a third connecting location positioned forwardly of the second connecting location. The track mounting means is characterized in that relative forward and rearward movement of the third connecting means is constrained to be along the track means on a forward and rearward first path of travel having a substantial longitudinal path component.

The first link mounting means is characterized in that with the flap member in its stowed position, initial rearward movement of the flap member constrains the second pivot connecting means to move in a rearward path having a substantial longitudinal path component so as to provide substantial Fowler motion for said flap member. Further movement of said flap member to its fully extended position causes the flap member to deflect to a substantially downwardly and rearwardly extending position.

Desirably, the track means comprises a longitudinally aligned track member, and the third connecting means comprises a track follower member constrained to move along said track member. Specifically, the track member is a slideway, and the track follower member comprises a slide block means. In one embodiment, the track mounting means further comprises actuating means, operatively connected to the track follower to cause movement of the flap member by causing movement of the track follower. The actuating means in this particular embodiment comprises a screw jack made up of a longitudinally extending screw member, and the track follower comprises a nut member engaging the screw member.

With the flap member in its stowed position, in the preferred form, the upper second connecting location is positioned substantially above said first connecting location, so that initial rearward movement of the second pivot connecting means is substantially longitudinal, and later movement of the second pivot connecting means to the fully deployed position has a substantial downward component.

Further, in the preferred form, the flap assembly comprises a fairing which in the stowed first position encloses the mounting structure. The fairing is pivotally mounted to the airfoil, and operatively connected to the flap assembly so that rearward movement of the flap member pivots said fairing downwardly. In the specific form shown herein, the fairing is connected through a fairing link member to the link mounting means.

The link mounting means and the track means are arranged in a manner that the flap member has an intermediate position between the stowed first position and the extended second position. In the intermediate position, the flap member forms a slot between the airfoil and the flap member.

In a specific embodiment of the present invention, there is a vane member mounted to a leading edge of the flap member. This vane member is positioned so that with the flap in its intermediate position, the vane member is located adjacent the rear end of the airfoil and above the slot formed by the flap member. With further movement of the flap member to its fully extended position, the vane member is spaced from the rear end of the airfoil to form a second slot with the airfoil.

In yet another embodiment, there is a second flap having a third stowed position adjacent the flap member, and movable rearwardly to a fourth fully deployed position, where the second flap is spaced from the flap member. In this specific embodiment, the second flap is pivotally connected to the first link mounting means by fourth connecting means at a fourth connecting location. Thus rearward movement of the link mounting means moves the second flap towards its fourth position.

Desirably the fourth connecting location is spaced from the first connecting location at a distance greater than a distance that the second connecting location is spaced from the first connecting location. Thus, rearward movement of the link mounting means moves the second flap rearwardly a greater distance than the flap member is moved.

In this specific embodiment discussed immediately above, the second flap member is mounted to the first flap member by a second track mounting means comprising track means mounted to the flap member and fifth connecting means that is connected to the second track means so as to be movable along the second track means.

Other features of the present invention will become apparent from the following detailed description.

DESCRIPTION OF THE PREFERRED EMBODIMENTS

Figure 1:
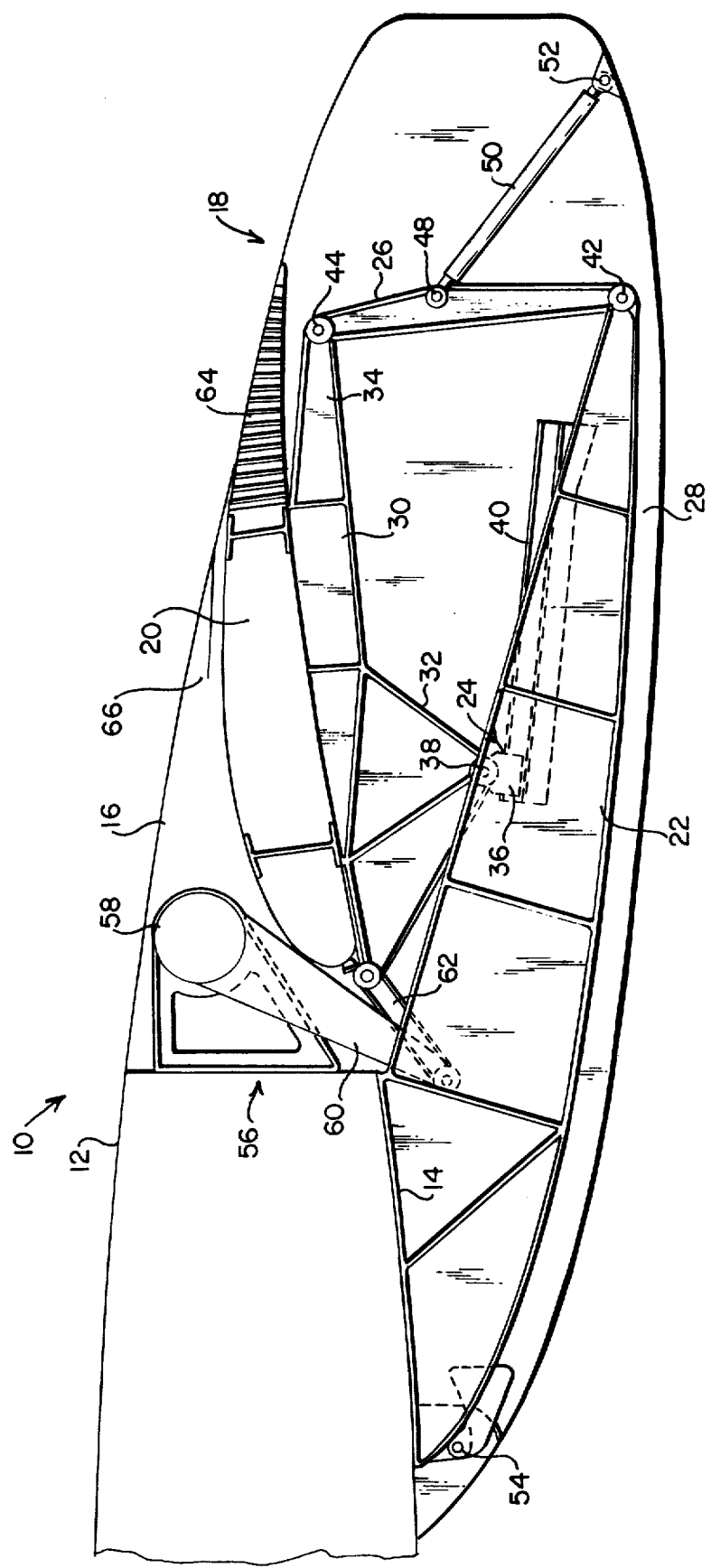
FIG. 1 is a sectional view of an aft portion of an airfoil incorporating the flap assembly of the present invention, with the flap being in its stowed position.
Figure 2:
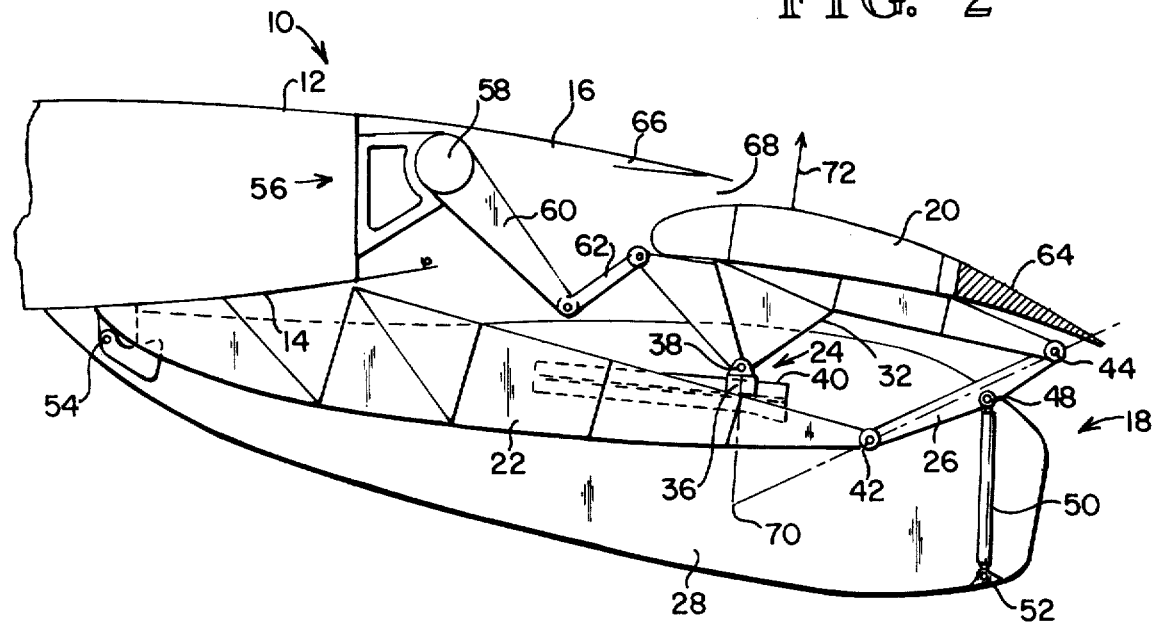
FIG. 2 is a view similar to FIG. 1, showing the flap deployed to an intermediate position for take-off.
Figure 3:
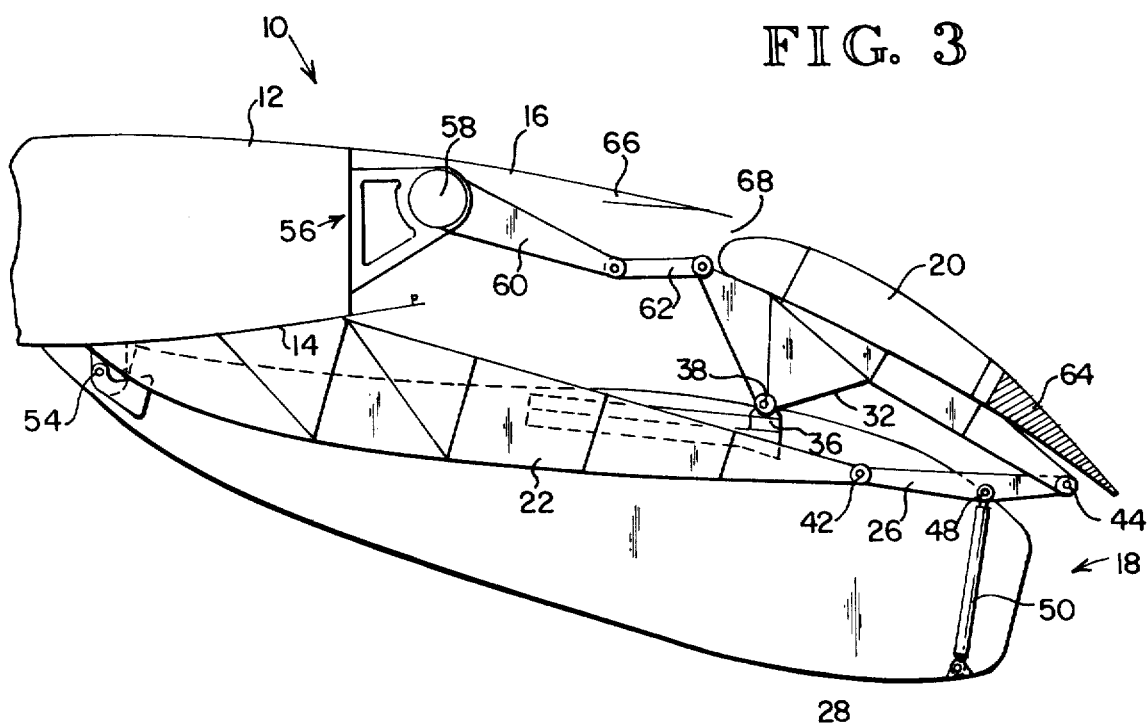
FIG. 3 is a view similar to FIGS. 1 and 2, showing the flap in its fully deployed position.

FIGS. 1 through 3 show a first embodiment of the present invention. There is an airplane wing 10, having an upper surface 12, a lower surface 14, a trailing edge portion 16, and a leading edge (not shown in the drawings for convenience of illustration). The flap assembly 18 comprises a single flap member 20 having a stowed position in the trailing edge wing portion 16 (as shown in FIG. 1), and movable through an intermediate position (shown in FIG. 2) to a fully deployed position (shown in FIG. 3). Extending rearwardly from the lower edge of the wing 10, and positioned moderately below the chordwise or longitudinal axis of the wing 10 is a mounting structure 22. With the flap member 20 in its stowed position, the mounting structure 22 is positioned directly below the flap member 20. The flap member 20 is mounted to the structure 22 through a forward track mounting means, generally designated 24, and a rear link member 26. A movable fairing 28 encloses the mounting structure 22, the forward mounting means 24 and the rear link member 26.

Rigidly attached to the bottom side of the flap member 20 is a mounting arm 30, having a forward downwardly extending portion 32 and a rearwardly extending portion 34. The forward mounting means 24 comprises a slide block 36 (which serves the function of a tracking member) pivotally connected at 38 to the lower end of the forward mounting arm portion 32. This slide lock 36 is mounted in a slideway member 40 (which serves the function of a track member), attached to the mounting structure 22. In the particular arrangement shown in FIGS. 1 through 3, the slideway member is substantially longitudinally aligned (i.e, aligned with the chordwise axis of the wing 10) with a very moderate downward and rearward slope, and has a straight line configuration.

To avoid the wear problems associated with the line contact of prior art roller carriages on tracks, this invention utilizes moving joints with surface contact. The elements used are bushed pin points, spherical bearing joints and slide blocks. Slide backs can be used, because the tracks used in this invention are straight. It is obvious, that the slide blocks could be replaced by roller carriages with a multitude of rollers in line (lower load than single roller). However, the preferred configuration is the slide block, as shown at 36.

The link member 26 has a lower pivot connection 42 at the extreme rear end of the mounting structure 22. The upper end of the link member 26 is pivotally connected at 44 at the extreme rear end of the mounting arm 34. Pivotally connected at 48 to an intermediate portion of the link 26 is a second link 50, which extends downwardly and rearwardly to connect pivotally at its opposite end 52 to the rear portion of the fairing 28. The fairing 28 is pivotally connected by its forward end at 54 to the bottom side of the wing 10. As will be disclosed hereinafter, rearward movement of the link member 26 causes the second link 50 to swing the fairing 28 downwardly.

Movement of the flap assembly 18 is accomplished through an actuating mechanism 56 comprising a rotary hinge 58 to which is mounted a radially extending crank arm 60. A drive link 62 has a pivot connection between the end of the crank arm 60 and the extreme forward end of the forward mounting arm portion 32 of the flap member 20.

To describe the operation of the present invention, attention is directed first to FIG. 1, which shows the flap member 20 in its stowed position. In that position, the forward and middle portion of the flap member 20 is concealed in the trailing edge portion 16 of the wing 10, and only the upper rear surface portion 64 of the flap member 26 is exposed. With the flap member 26 in its stowed position, this upper rear surface portion 64 forms a substantial continuous aerodynamic surface with the upper wing surface 12 at its rear cove panel 66. This is the location of the flap member 20 for cruise configuration.

To move the flap member 20 rearwardly, the crank arm 60 is rotated counterclockwise. Since the slideway 48 is substantially longitudinally aligned, initial movement of the forward portion of the flap member 20 is also in a longitudinal direction. Also, since in the stowed position the upper pivot connection 44 of the link 26 is above and slightly forwardly of the lower pivot connection 42 of the link 20, the initial movement of the rear portion of the flap member 20 is also substantially longitudinal. Thus, as the flap member 20 moves rearwardly to the position of FIG. 2, there is substantial rearward movement of the flap member 20, and the entire flap 26 moves downwardly to a moderate extent so that it is moved away from the cove panel 66, thus forming a slot 68. Also, in moving to the position of FIG. 2, it is readily apparent that there is little downward deflection (i.e., rotation) of the flap member 20. It also becomes readily apparent that the position of the flap 20 in FIG. 2 is well adapted for take-off, where the flap 20 (due to the substantial Fowler movement in moving to that position) increases lift to a substantial extent without an unacceptable increase in drag. At the same time, the second link 50 swings the fairing 28 away from the flap 20.

Further counterclockwise movement of the crank arm 60 causes the slide block 36 to move only a moderate distance rearwardly, but causes a correspondingly greater movement of the link 26 downwardly. This causes the flap member 20 to change its angle of attack substantially to the position of FIG. 3. The position shown in FIG. 3 is well adapted for landing of the aircraft where maximum lift is desired, with greater drag than in the position of FIG. 2.

With regard to the actuating force required, and the loads on the structural members, it should be noted that as the flap 20 moves to its deployed position, the instantaneous center of rotation (indicated at 70 in FIG. 2) is slightly forward of the lift component generated by the flap 20, indicated at 72. Thus, the aerodynamic loads on the flap 20 act with moderate force to move the flap 20 back toward it stowed position. This arrangement insures that the actuating force required to move the flap 20 rearwardly would be relatively small and that in case of a failure in the actuation system the flap would have the tendency to stow (failsafe loads).

Figure 4:
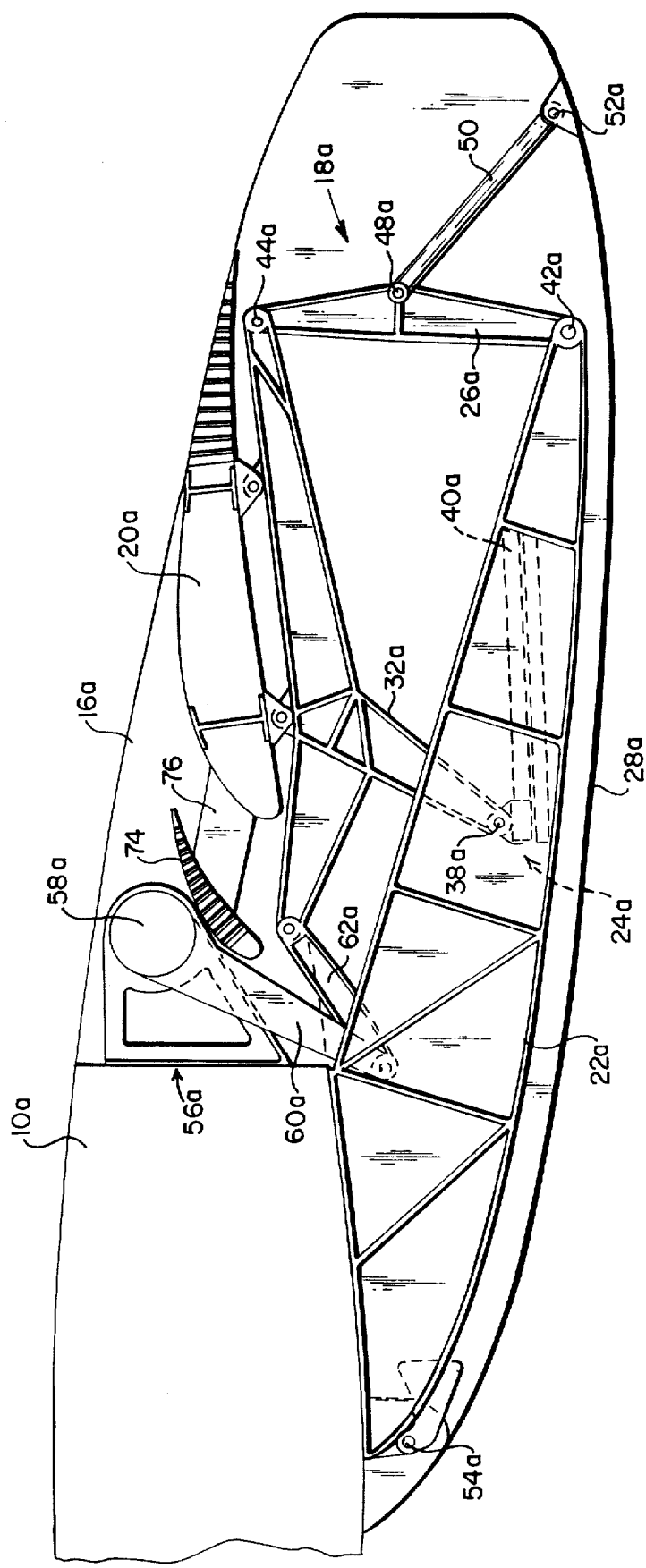
FIG. 4 is a view similar to FIG. 1, showing a second embodiment of the present invention.
Figure 5:
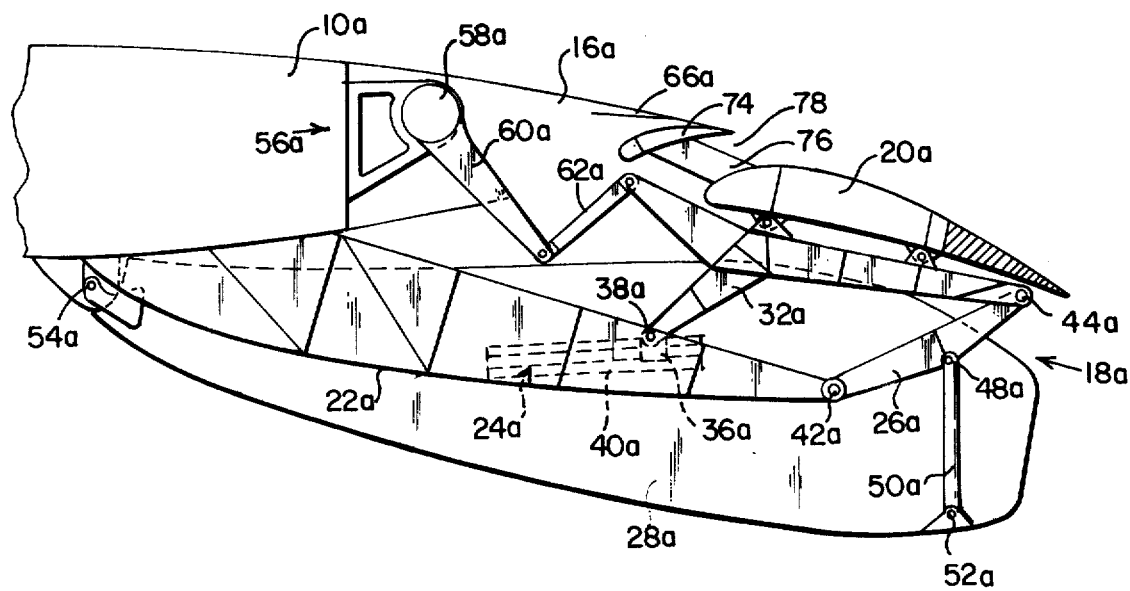
FIG. 5 is a view of the second embodiment, with the flap in its intermediate position.
Figure 6:
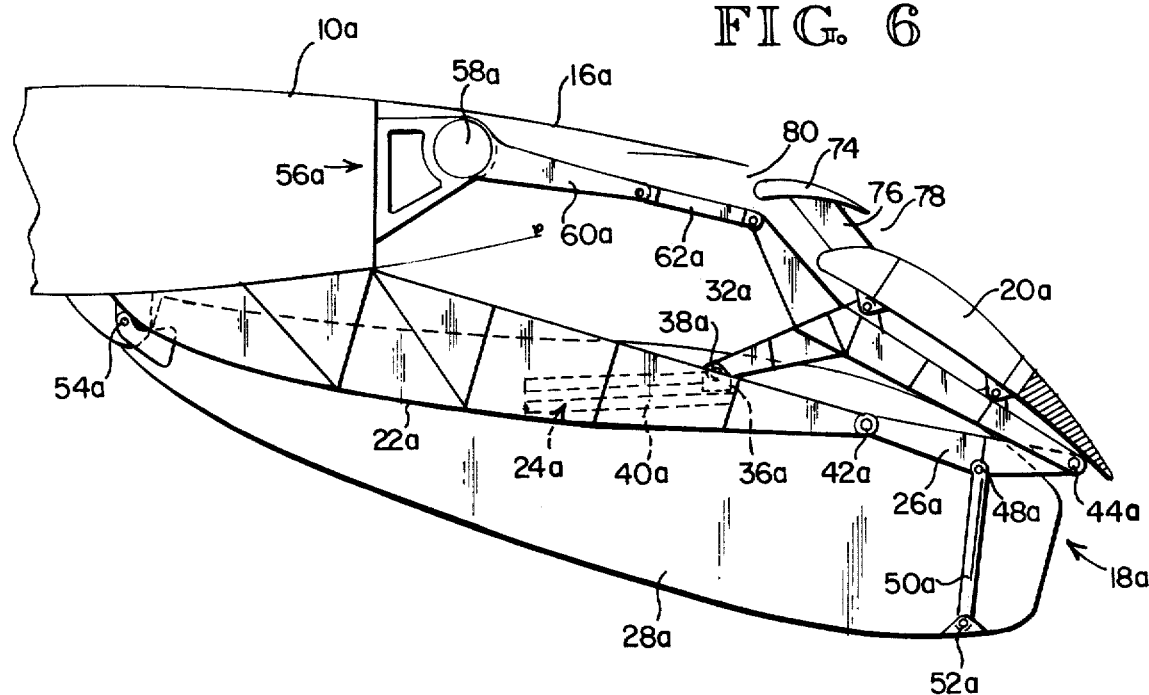
FIG. 6 is a view of the second embodiment, showing the flap in its fully deployed position for landing.

FIGS. 4, 5 and 6 illustrate a second embodiment of the present invention. Components of the second embodiments which are similar to corresponding components of the first embodiment will be given like numerical designations, with an "a" suffix, distinguishing those of the second embodiment.

The second embodiment of FIGS. 4 through 6 differs from the first embodiment in that a fixed vane, designated 74 is adeed to the flap assembly 18a. Thus, in the second embodiment there is the wing 10a, flap assembly 18a, flap member 20a, mounting structure 22a, forward track mounting means 24a, the link member 26a, and a movable cowling 28a. The other components which are similar to the corresponding components to the first embodiment will not be described in detail with regard to the second embodiment, the numerical designations, with the "a" suffix will be used to indicate those components.

The vane 74 is mounted forwardly and moderately upwardly of the leading edge of the flap member 20a. This is accomplished by means of a strut 76 rigidly attached to the leading edge of the flap member 20a and connected to the bottom surface of the vane 74. It will be noted that the slideway 40a has a very moderate upward slant in a rearward direction. This slideway 40a and the rear link 26a are so arranged that when the flap 20a is moved to its intermediate position (shown in FIG. 5), the upper surface of the trailing edge of the vane 74 fits against the lower surface of the trailing edge of the cove panel 66a. Thus, the vane 74 forms with the flap 20a a single slot 78, with this flap position, as shown in FIG. 5, being well suited for the take-off configuration where a high lift over drag ratio is needed.

Further rearward movement of the flap 20a carries the vane 76 rearwardly and slightly downwardly from the cove panel 66a to form a second slot 80 between the cove panel 66a and the vane 76. This configuration, shown in FIG. 6, places the flap 20a and vane 76 in an arrangement to produce greater lift and greater drag, this being well adapted for landing of the aircraft. In the position of FIG. 6, the flap 20a slants downwardly in a rearward direction to a substantially greater extent than in the position of FIG. 5.

As a modification to this second embodiment, the actuating mechanism of the flap assembly 18a can be modified so that a hydraulic cylinder is used to push against the crank arm 60a. In this case, the rotary hinge 58a is replaced by a torque tube that is connected to the several linkage assemblies 18a along the span of the wing, with the torque tube insuring that the various assemblies 18a move synchronously. This modification could be used on the other embodiments as well.

Figure 7:
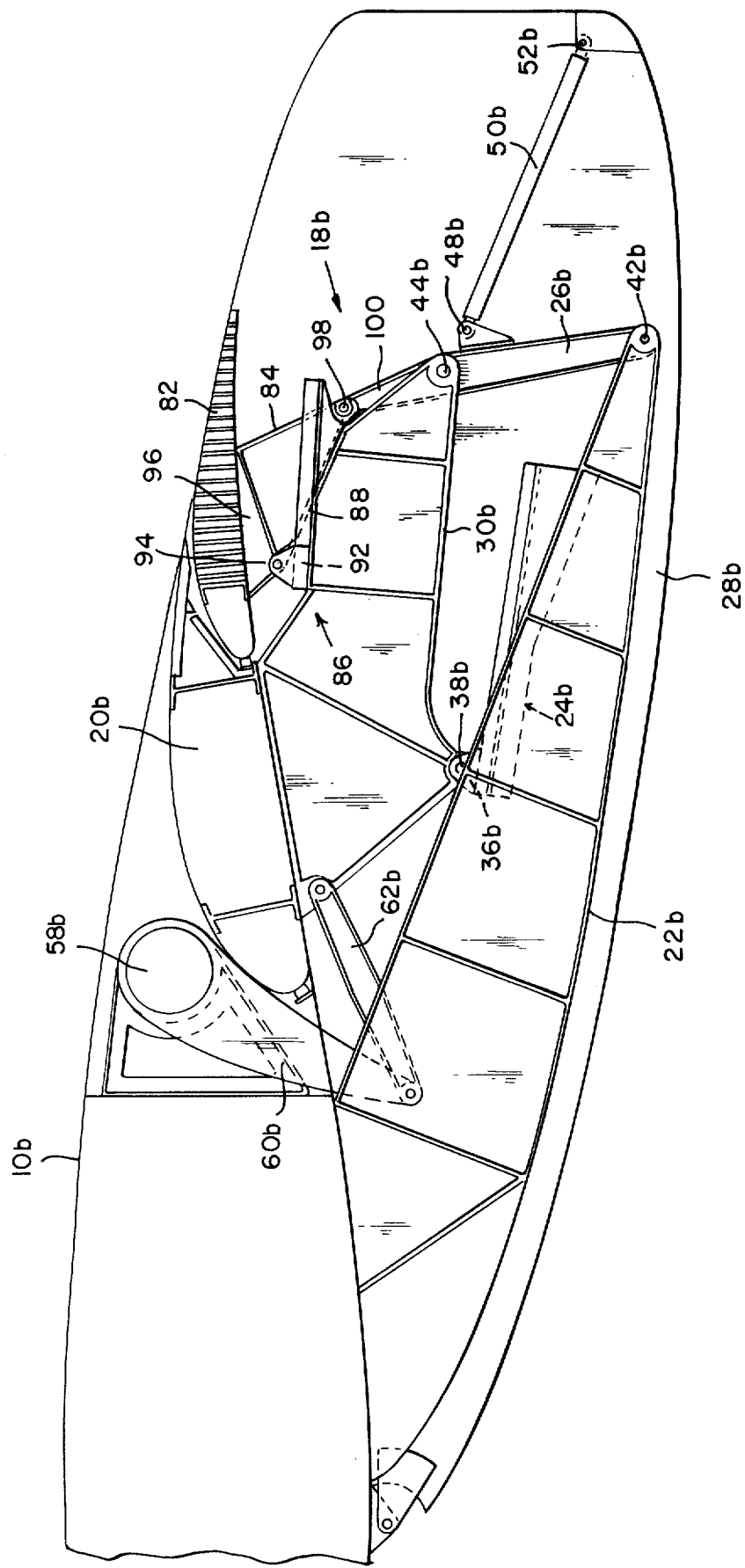
FIG. 7 is a view similar to FIGS. 1 and 4, showing a third embodiment of the present invention.
Figure 8:
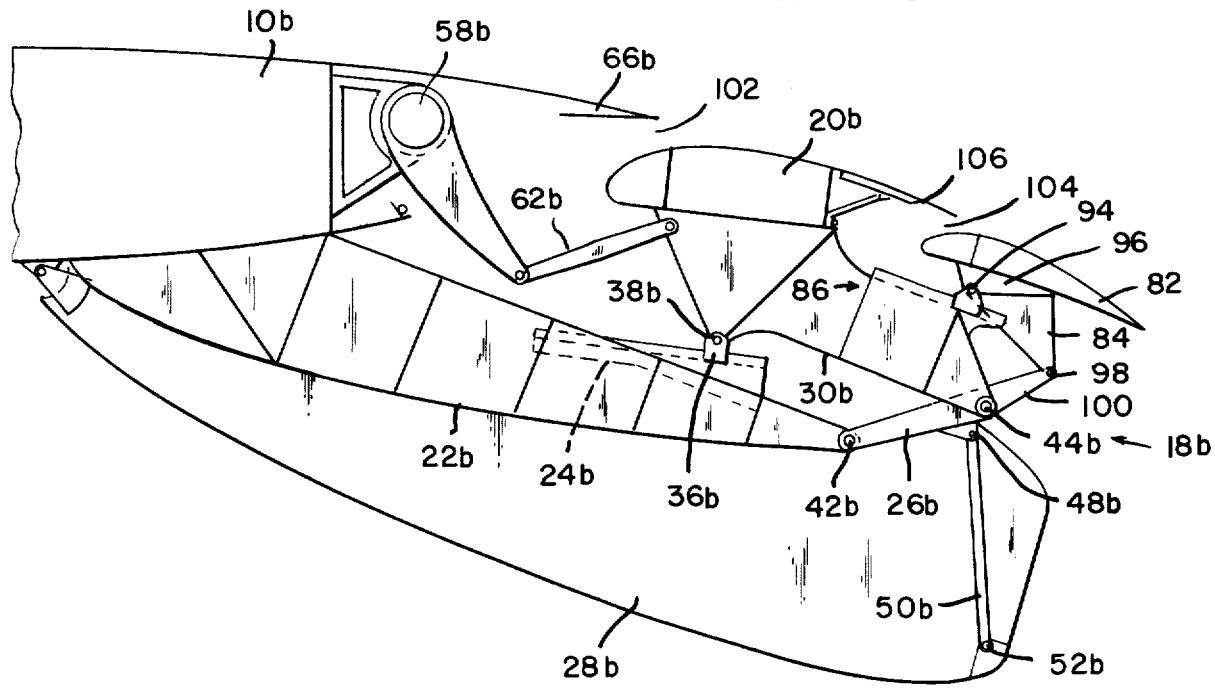
FIG. 8 is a further view of the third embodiment of FIG. 7, showing the two flap members in an intermediate position for take-off.
Figure 9:
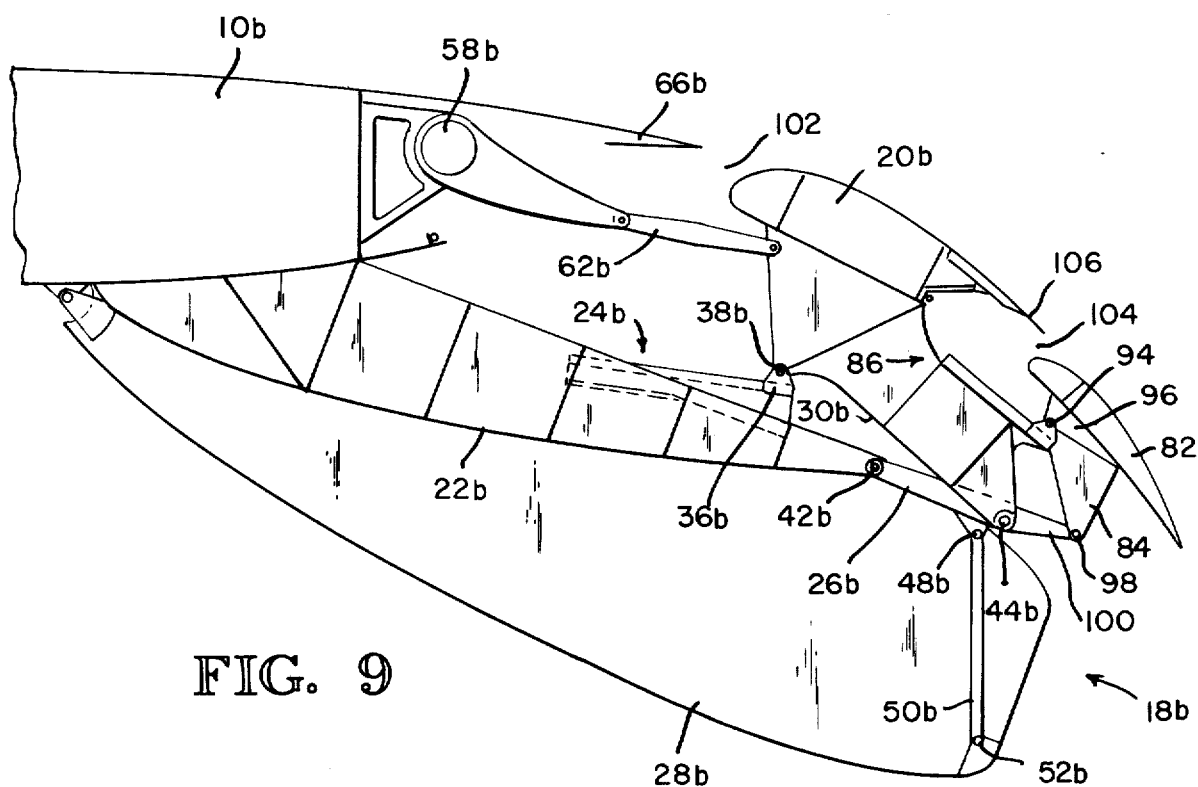
FIG. 9 is a third view of the third embodiment of FIG. 7 and 8, showing the flap members in their fully deployed position.

FIGS. 7, 8 and 9 illustrate a third embodiment of the present invention. Components of this third embodiment which are similar to corresponding components of the first embodiment will be given like numerical designations, with a "b" suffix distinguishing those of the third embodiment.

The third embodiment of FIGS. 7 through 9 differs from the first embodiment in that the main flap functions as a fore flap, and there is an aft flap added. Thus, in the third embodiment there is a wing 10b, flap assembly 18b, flap member 20b, mounting structure 22b, forward track mounting member 24b, the link member 26b, and a movable fairing 28b. The other components which are similar to the corresponding components of the first embodiment will not be described in detail with regard to the third embodiment, and numerical designations with the "b" suffix will be used to indicate those components.

In the third embodiment, there is the aft flap 82, having a rigid mounting arm 84 connected to its bottom surface. To mount the aft flap 82, there is a second upper track mounting assembly 86, comprising a slideway 88 rigidly connected to the mounting arm 30b that is rigidly connected to the lower side of the fore flap 20b. The specific configuration of the mounting arm 30b is modified slightly so that it is able to support the upper slideway 88 at a location relatively close to the lower surface of the aft flap 82.

A second slide block 92 is pivotally connected at 94 to an upper forward portion 96 of the mounting arm 84. The lower rear end of the mounting arm 84 is pivotally connected at 98 to an upward extension 100 of the rear link 26b. Thus, the link 26b, with the extension 100, has the lower pivot connection 42b, the upper pivot connection 44b, and an uppermost pivot connection 98 to the aft flap 82. With this arrangement, the rear link 26b, with its extension 100, serves not only as the rear pivot link for the fore flap 20b, to operate in conjunction with the first track mounting means, but also serves as the mounting link for the aft flap 82 to act in conjunction with the second track mounting means 86.

To described the operation of this third embodiment, counterclockwise rotation of the rotary hinge 58b pushes the mounting arm 30b rearwardly to cause the lower slide block 36b to move rearwardly, and also to cause the rear link 26b to swing rearwardly about the lower pivot location 42b. This initial rearward movement causes the fore flap 20b to move rearwardly with substantial Fowler motion toward the position of FIG. 8. At the same time, the upper pivot connection 98 moves the aft flap 82 rearwardly relative to the fore flap 20b, also with substantial Fowler motion, toward the position of FIG. 8. This opens a first slot 102 between the fore flap 20b and the rear cove panel 66b of the wing 10b. It also opens a second slot 104, between the aft flap 82 and a rear cove panel 106 of the fore flap 20b.

To move the flap assembly 18b from the position of FIG. 8 to that of FIG. 9 (which is the landing configuration), the rotary hinge 58b is rotated further counterclockwise. This causes the flaps 20b and 82 to move a moderate distance further rearwardly, and also to rotate downwardly to a substantial degree, until they reach their fully extended position of FIG. 9.

Figure 10:
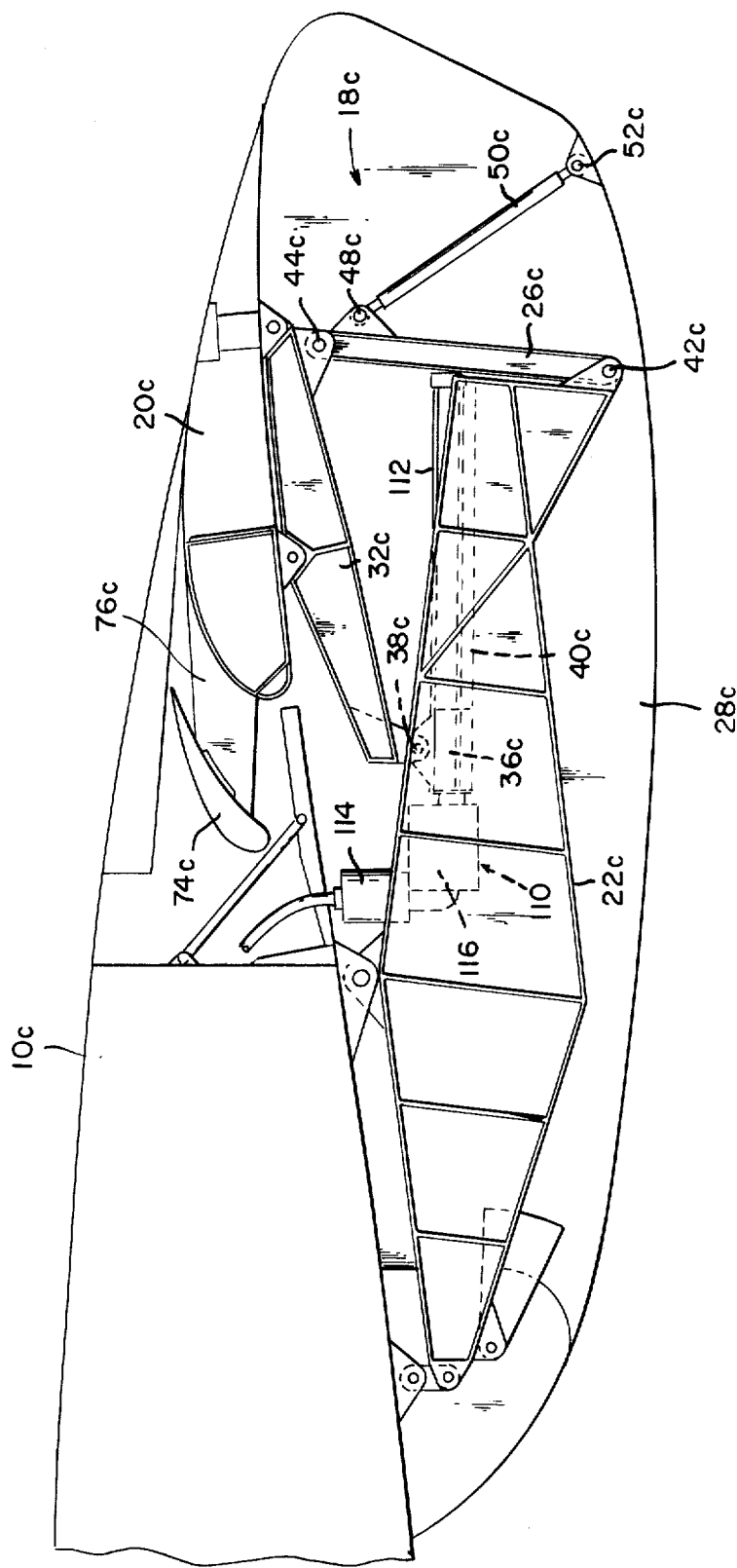
FIG. 10 is a sectional view of a fourth embodiment of the present invention, with the flaps in the stowed position.

A fourth embodiment of the present invention is illustrated in FIG. 10. This fourth embodiment is similar to the second embodiment, so numerical designations, given to components of the second embodiment will also be given to the corresponding components of the fourth embodiment, with a "c" suffix distinguishing those of the fourth embodiment. As in the second embodiment, there is the wing 10c, main flap 20c, and the vane 74c rigidly mounted by a strut 76c to the main flap 20c. However, instead of using a rotary hinge and a crank arm to cause movement of the flap assembly to its intermediate and fully deployed positions, there is instead substituted a screw drive assembly 110.

This drive assembly 110 comprising a longitudinally extending screw jack with the screw member 112 positioned inside the track 40c. The slide block 36c is mounted in the track 40c and is provided with interior threads to function as a nut member engaging the screw 112. There ar two redundant drive motors, one of which is indicated at 114, sychonized through a high speed flex shaft, and a high gear ratio reduction gear assembly 116. The screw member 112 is driven from the gear assembly 116. Thus movement of the main flap 20c is accomplished by turning the screw member 112 and causing longitudinal movement of the nut-slide block member 36c.

To optain proper leverage for the actuation system, the track member 40c is positioned so that it is aligned with an approximate mid-point of the rear link 26c. In other respects, the components and operation of this fourth embodiment of FIG. 10 are quite similar to the components and operation of the second embodiment shown in FIGS. 4 through 6. Accordingly, it is believed that no further description is necessary to achieve a proper understanding of the structure and operation of this fourth embodiment.

What is claimed is:

1. A flap assembly for an airfoil having upper and lower surfaces, a forward end and a rearward end, a longitudinal axis and a transverse axis, said flap assembly comprising: a mounting structure located at a first lower location at the rearward end of the airfoil; a flap member having a stowed first position above said mounting structure at the rearward end of said airfoil and movable rearwardly to a fully extended second position; a first link mounting means having a lower first pivot connecting means attached to said mounting structure at a first connecting location and an upper second pivot connecting means mounted to said flap member at an upper second connecting location; a track mounting means comprising track means and a third connecting means connected to said flap member and also operatively connected to said track means at a third connecting location positioned forwardly of said second connecting location; said track mounting means being characterized in that relative forward and rearward movement of said third connecting means is constrained to be along said track means on a forward and rearward first path of travel having a substantial longitudinal path component; said first link mounting means being characterized in that with said flap member in its stowed first position, initial rearward movement of said flap member causes said second pivot connecting means to move in a rearward path having a substantial longitudinal path component so as to provide substantial Fowler motion for said flap member, and further movement of said flap member to its fully extended position causes said flap member to deflect to a substantially downwardly and rearwardly extending position; a second flap having a third stowed position adjacent said flap member and movable rearwardly to a fourth fully deployed position, where said second flap is spaced from said flap member; said second flap being pivotally connected to said first link mounting means by fourth connecting means at a fourth connecting location, whereby rearward movement of said link mounting means moves said second flap toward its fourth position; and said fourth connecting location being spaced from said first connecting location at a distance greater than a distance which said second connecting location is spaced from said first connecting location, whereby rearward movement of said link mounting means moves said second flap rearwardly a greater distance than said flap member is moved.

2. The flap assembly as recited in claim 1, wherein said second flap member is mounted to said first flap member by second track mounting means comprising track means mounted to said flap member; and a fifth connecting means connected to said second track means so as to be movable along said second track means.

3. A flap assembly for an airfoil having upper and lower surfaces, a forward end and a rear end, a longitudinal axis and a transverse axis, said flap assembly comprising: a mounting structure located at a first lower location at the rearward end of the airfoil; a flap member having a stowed first position above said mounting structure at the rearward end of said airfoil and movable rearwardly to a fully extended second position; a first link mounting means having a lower first pivot connecting means attached to said mounting structure at a first connecting location and an upper second pivot connecting means mounted to said flap member at an upper second connecting location; a track mounting means comprising track means and a third connecting means connected to said flap member and also operatively connected to said track means at a third connecting location positioned forwardly of said second connecting location; said track mounting means being characterized in that relative forward and rearward movement of said third connecting means is constrained to be along said track means on a forward and rearward first path of travel having a substantial longitudinal path component; said first link mounting means being characterized in that said flap member in its stowed first position, initial rearward movement of said flap member causes said second pivot connecting means to move in a rearward path having a substantial longitudinal path component so as to provide substantial Fowler motion for said flap member, and further movement of said flap member to its fully extended position causes said flap member to deflect to a substantially downwardly and rearwardly extending position; a second flap having a third stowed position adjacent said flap member and movable rearwardly to a fourth fully deployed position, where said second flap is spaced from said flap member; said second flap being pivotally connected to said first link mounting means by a fourth connecting means at a fourth connecting location, whereby rearward movement of said link mounting means moves said second flap toward its fourth position; said second flap member being mounted to said first flap member by second track mounting means comprising track means mounted to said flap member; and a fifth connecting means connected to said second track means so as to be movable along said second track means.

4. A flap assembly for an airfoil having upper and lower surfaces, a forward end and a rearward end, a longitudinal axis and a transverse axis, said flap assembly comprising: a mounting structure located at a first lower location at the rearward end of the airfoil; a flap member having a stowed first position above said mounting structure at the rearward end of said airfoil and movable rearwardly to a fully extended second position; a second flap having a third stowed position adjacent said flap member, and movable rearwardly to a fourth fully deployed position, where said second flap is spaced from said flap member; a first link mounting means having a lower first pivot connecting means attached to said mounting structure at a first connecting location, and an upper second pivot connecting means mounted to said flap member at an upper second connecting location; a track mounting means comprising track means and a third connecting means connected to said flap member and also operatively connected to said track means at a third connecting location positioned forwardly of said second connecting location; said track mounting means being characterized in that relative forward and rearward movement of said third connecting means is constrained to be along said track means on a forward and rearward first path of travel having a substantial longitudinal path component; said first link mounting means being characterized in that with said flap member in its stowed first position, initial rearward movement of said flap member causes said second pivot connecting means to move in a rearward path having a substantial longitudinal path component so as to provide substantial Fowler motion for said flap member and said second flap, and further movement of said flap member to its fully extended position causes said flap member and said second flap each to deflect to a substantially downwardly and rearwardly extending position; said second flap being pivotally connected to said first link mounting means by fourth connecting means at a fourth connecting location, whereby rearward movement of said link mounting means moves said second flap toward its fourth position; said fourth connecting location being spaced from said first connecting location at a distance greater than a distance which said second connecting location is spaced from said first connecting location, whereby rearward movement of said link mounting means moves said second flap rearwardly a greater distance than said flap member is moved.

5. The flap assembly as recited in claim 4, wherein said second flap is mounted to said first flap member by second track mounting means comprising track means mounted to said flap member; and a fifth connecting means connected to said second track means so as to be movable along said second track means.

6. A flap assembly for an airfoil having upper and lower surfaces, a forward end and a rearward end, a longitudinal axis and a transverse axis, said flap assembly comprising: a mounting structure located at a first lower location at the rearward end of the airfoil; a flap member having a stowed first position above said mounting structure at the rearward end of said airfoil and movable rearwardly to a fully extended second position; a second flap having a third stowed position adjacent said flap member and movable rearwardly to a fourth fully deployed position, where said second flap is spaced from said flap member; a first link mounting means having a lower first pivot connecting means attached to said mounting structure at a first connecting location, and an upper second pivot connecting means mounted to said flap member at an upper second connecting location; a track mounting means comprising track means and a third connecting means connected to said flap member and also operatively connected to said track means at a third connecting location positioned forwardly of said second connecting location; said track mounting means being characterized in that relative forward and rearward movement of said third connecting means is constrained to be along said track means on a forward and rearward first path of travel having a substantial longitudinal path component; said first link mounting means being characterized in that with said flap member in its stowed first position; initial rearward movement of said flap member causes said second pivot connecting means to move in a rearward path having a substantial longitudinal path component so as to provide substantial Fowler motion for said flap member and said second flap, and further movement of said flap member to its fully extended position causes said flap member and said second flap each to deflect to a substantially downwardly and rearwardly extending position; said second flap being pivotally connected to said first link mounting means by a fourth connecting means at a fourth connecting location, whereby rearward movement of said link mounting means moves said second flap toward its fourth position; and said second flap member being mounted to said first flap member by a second track mounting means comprising track means mounted to said flap member; and a fifth connecting means connected to said second track means so as to be movable along said second track means.

* * * * *